United States Patent
Kajiwara et al.

(10) Patent No.: US 9,812,676 B2
(45) Date of Patent: Nov. 7, 2017

(54) PRISMATIC SECONDARY BATTERY

(75) Inventors: Kouichi Kajiwara, Hitachinaka (JP);
Hayato Koguchi, Hitachinaka (JP);
Takeshi Hizono, Hitachinaka (JP);
Hiroaki Egawa, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 110 days.

(21) Appl. No.: 14/422,938

(22) PCT Filed: Aug. 31, 2012

(86) PCT No.: PCT/JP2012/072138
§ 371 (c)(1),
(2), (4) Date: Feb. 20, 2015

(87) PCT Pub. No.: WO2014/033906
PCT Pub. Date: Mar. 6, 2014

(65) Prior Publication Data
US 2015/0228936 A1    Aug. 13, 2015

(51) Int. Cl.
*H01M 2/02* (2006.01)
*H01M 2/04* (2006.01)
(Continued)

(52) U.S. Cl.
CPC ......... *H01M 2/024* (2013.01); *H01M 2/0217* (2013.01); *H01M 2/0426* (2013.01); *H01M 2/0439* (2013.01); *H01M 2/0473* (2013.01); *H01M 10/0431* (2013.01); *H01M 10/0587* (2013.01); *H01M 2220/20* (2013.01)

(58) Field of Classification Search
CPC .................................................. H01M 2/0473
See application file for complete search history.

(56) References Cited

U.S. PATENT DOCUMENTS

| 5,879,416 A | 3/1999 | Nakamura et al. |
| 6,627,348 B1 | 9/2003 | Haraguchi et al. |
| (Continued) | | |

FOREIGN PATENT DOCUMENTS

| JP | 08-315788 A | 11/1996 |
| JP | 2000-133211 A | 5/2000 |
| (Continued) | | |

OTHER PUBLICATIONS

European Search Report for corresponding EP Application 12883736.6 dated Feb. 9, 2016.

*Primary Examiner* — Patrick Ryan
*Assistant Examiner* — Christopher Domone
(74) *Attorney, Agent, or Firm* — Volpe and Koenig, P.C.

(57) ABSTRACT

A prismatic secondary battery includes a battery case in a prismatic shape and a battery cover which seals up an opening part of the battery case. The battery cover has a convex part which projects toward the inside of the battery case, faces an inner surface of a side wall part of the battery case, and extends continuously along the entire periphery of the side wall part. Cover thickness of a contact part of the battery cover which is in contact with the upper end of the side wall part of the battery case at a position outside the convex part is greater than ½ of cover thickness of a blockage part blocking up an opening part at a position inside the convex part and is less than the cover thickness of the blockage part.

8 Claims, 11 Drawing Sheets

(51) Int. Cl.
*H01M 10/04* (2006.01)
*H01M 10/0587* (2010.01)

(56) References Cited

U.S. PATENT DOCUMENTS

| | | | |
|---|---|---|---|
| 2010/0028759 A1 | 2/2010 | Elbine et al. | |
| 2010/0190053 A1* | 7/2010 | Suzuki | H01M 2/0473 429/185 |
| 2012/0052349 A1 | 3/2012 | Kim et al. | |

FOREIGN PATENT DOCUMENTS

| | | | |
|---|---|---|---|
| JP | 2004-031027 A | | 1/2004 |
| JP | 2004195490 | * | 7/2004 |
| JP | 2008-159536 A | | 7/2008 |
| JP | 2010-097770 A | | 4/2010 |
| JP | 2011-181215 A | | 9/2011 |
| WO | 2009/014068 A1 | | 1/2009 |
| WO | 2010/146700 A1 | | 12/2010 |

* cited by examiner

F I G . 1
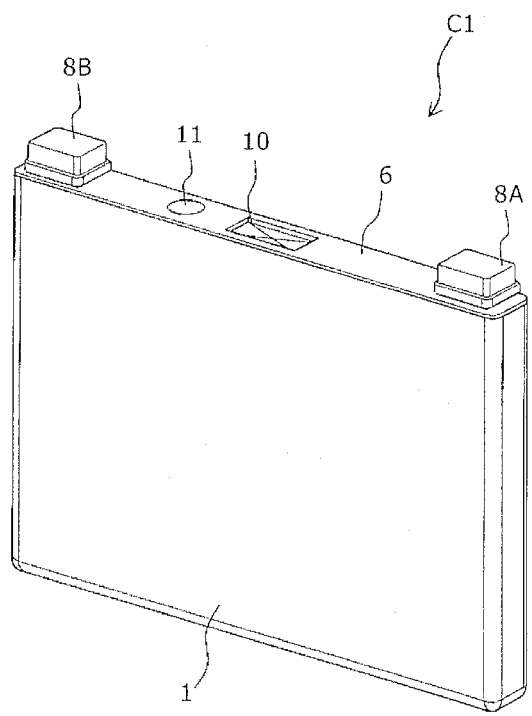

PRISMATIC SECONDARY BATTERY

TECHNICAL FIELD

The present invention relates to a prismatic secondary battery used for the purpose of vehicle installation, for example.

BACKGROUND ART

Development of lithium-ion secondary batteries with high energy density serving as power sources of battery electric vehicles and other types of vehicles has been promoted energetically in recent years. In secondary batteries for vehicle installation, higher electric current flows through the battery in comparison with secondary batteries for cellular phones or other devices. Therefore, prevention of the mixing of water into the battery and the leakage of the electrolyte is highly essential and the sealability of the battery is a critical issue. Patent Document 1, for example, discloses a prismatic secondary battery in which a winding electrode is stored in a battery case, the electrolyte is injected into the battery case, and thereafter the battery housing is hermetically sealed up with a cover welded to the battery case. That in Patent Document 2 has a structure in which a convex part is formed on the back side of the cover.

PRIOR ART LITERATURE

Patent Documents

Patent Document 1: JP2010-97770-A
Patent Document 2: JP-2004-310217-A

SUMMARY OF THE INVENTION

Problem to be Solved by the Invention

In Patent Document 1, the battery case and the battery cover are joined together by means of welding in order to hermetically seal up the battery housing. The joining by means of welding increases the reliability of the hermetic sealing. However, a spatter caused in the welding can mix into the inside of the battery as a metallic foreign matter and contribute to a minute short circuit.

It is therefore an object of the present invention is to prevent the mixing of metallic foreign matters into the battery due to the spatter in the welding of the battery cover to the metallic battery case and thereby provide a prismatic secondary battery with high reliability.

Means for Solving the Problem

A prismatic secondary battery according to the present invention achieving the above object comprises: battery case in a prismatic shape which includes a bottom wall part in a rectangular shape, aside wall part in a prismatic tubular shape extending up from the bottom wall part, and an opening part being open upward at an upper end of the side wall part; and a battery cover which is welded to the upper end of the side wall part of the battery case and seals up the opening part. The battery cover has a convex part which projects toward an inside of the battery case, faces an inner surface of the side wall part of the battery case, and extends continuously along an entire periphery of the side wall part. Cover thickness at a contact part which is in contact with the upper end of the side wall part of the battery case at a position outside the convex part is greater than ½ of cover thickness at a blockage part blocking up the opening part at a position inside the convex part and is less than the cover thickness at the blockage part.

Effect of the Invention

According to the present invention, the mixing of metallic foreign matters into the battery due to the spatter can be prevented at the time of the welding of the battery cover to the battery case and a prismatic secondary battery with high reliability can be provided. Other objects, configurations and advantages will be clarified in the following description of embodiments.

BRIEF DESCRIPTION OF THE DRAWINGS

FIG. 1 is an external perspective view of a prismatic secondary battery according to a first embodiment of the present invention.

MODE FOR CARRYING OUT THE INVENTION

Figure 2:
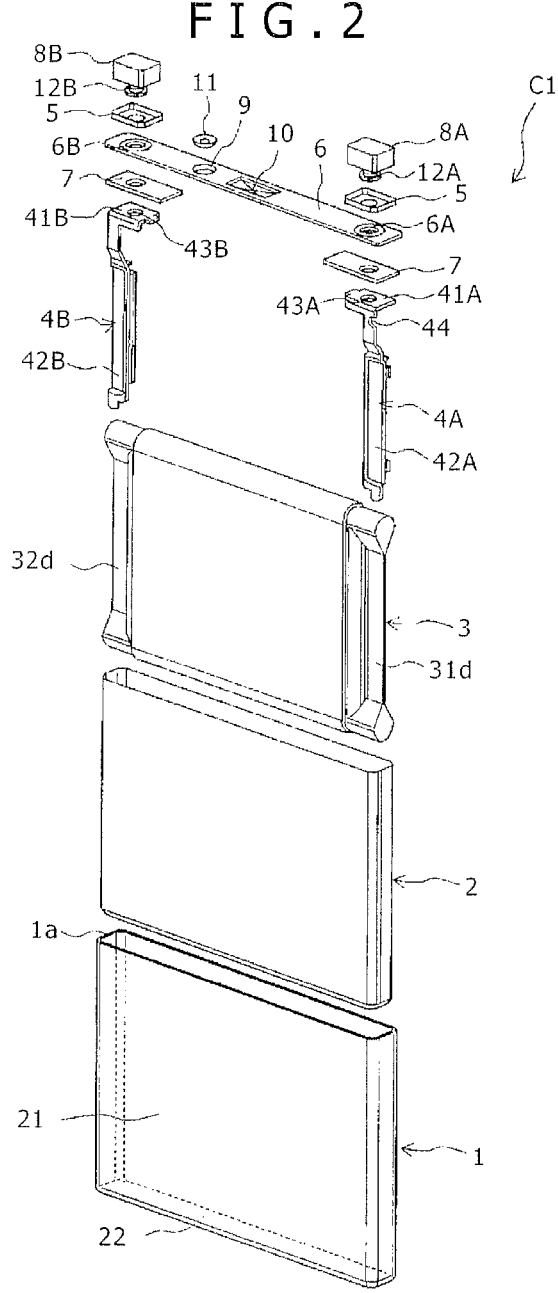
FIG. 2 is an exploded perspective view of the prismatic secondary battery according to the first embodiment.

With reference to the drawings, a description will be given in detail of preferred embodiments of the present invention.

A prismatic secondary battery according to an embodiment of the present invention comprises: a battery case in a prismatic shape which includes a bottom wall part in a rectangular shape, a side wall part in a prismatic tubular shape extending up from the bottom wall part, and an opening part being open upward at an upper end of the side wall part; and a battery cover which is welded to the upper end of the side wall part of the battery case and seals up the opening part. The battery cover has a convex part which projects toward the inside of the battery case, faces an inner surface of the side wall part of the battery case, and extends continuously along the entire periphery of the side wall part. Cover thickness at a contact part which is in contact with the upper end of the side wall part of the battery case at a position outside the convex part is greater than ½ of cover thickness at a blockage part blocking up the opening part at a position inside the convex part and is less than the cover thickness at the blockage part.

First Embodiment

FIG. 1 is an external perspective view of a prismatic secondary battery according to a first embodiment of the present invention.

The prismatic secondary battery C1 comprises a battery case 1 and a cover (battery cover) 6. A power generation element 3 (see FIG. 2) is stored in the battery case 1 and an opening part 1a of the battery case 1 is sealed up with the cover 6. The cover 6 is joined to the battery case 1 by laser welding. A hermetically sealed battery container is formed by the battery case 1 and the cover 6. The cover 6 is equipped with a positive external terminal 8A and a negative external terminal 8B. Via the positive external terminal 8A and the negative external terminal 8B, the power generation element 3 (see FIG. 2) is electrically charged or supplies electric power to an external load. The cover 6 is integrally provided with a gas release vent 10. When the pressure in the battery container rises, the gas release vent 10 opens, releases gas from inside, and reduces the pressure in the battery container, by which the safety of the prismatic secondary battery C1 is secured.

Next, the configuration inside the battery case 1 of the prismatic secondary battery C1 will be described below with reference to FIG. 2.

FIG. 2 is an exploded perspective view of the prismatic secondary battery according to the present embodiment.

The battery case 1 of the prismatic secondary battery C1 is formed in a so-called prismatic shape. The battery case 1 includes a bottom wall part 22 in a rectangular shape, a side wall part 21 in a prismatic tubular shape extending up from the bottom wall part 22, and an opening part 1a being open upward at the upper end of the side wall part 21. The battery case 1 stores the power generation element 3 via an insulating sheet 2. The power generation element 3 is an electrode assembly that is formed by a positive electrode body and a negative electrode body being flatly wound while a separator is placed between the positive and negative electrode bodies. At both edges of the power generation element 3 in the direction of the winding axis, electrode foil exposed parts 31c and 32c not coated with either a positive electrode active material mix or a negative electrode active material mix are formed.

Since the power generation element 3 is flatly wound, the power generation element 3 includes a pair of curved parts having semicircular cross-sectional shapes and facing each other and a flat part continuously formed between the pair of curved parts. The power generation element 3 is inserted into the battery case 1 from one of the curved parts so that the winding axis direction of the power generation element 3 coincides with the width direction of the battery case 1. In this state, the other curved part of the power generation element 3 is situated at the upper opening of the battery case 1.

At least part of a positive electrode connection part 31d, serving as the aforementioned flat part and electrode foil exposed part of the power generation element 3, is bundled and formed into a shape like a flat plate, overlaid on an end of a positive electrode current collector plate current collector terminal) 4A, and connected to the end of the positive electrode current collector plate 4A. Similarly, at least part of a negative electrode connection part 32d, serving as the aforementioned flat part and electrode foil exposed part of the power generation element 3, is bundled and formed into a shape like a flat plate, overlaid on an end of a negative electrode current collector plate (current collector terminal) 4B, and connected to the end of the negative electrode current collector plate 4B.

The other ends of the positive electrode current collector plate 4A and the negative electrode current collector plate 4B are connected to the positive external terminal 8A and the negative external terminal 8B, respectively. The positive electrode current collector plate 4A is equipped with current interruption means (fuse) 44 for interrupting the electric current when excessive current flows. For example, the current interruption means 44 is formed by narrowing a part of the positive electrode current collector plate 4A so that the narrowed part is blown out (melted and disconnected) by the excessive current to separate the positive electrode current collector plate 4A into two parts: the power generation element 3's side and the positive external terminal 8A's side. It should be noted while the current interruption means 44 is arranged in the positive electrode current collector plate 4A in the present embodiment, the current interruption means 44 may also be arranged in the negative electrode current collector plate 4B or in both the positive electrode current collector plate 4A and the negative electrode current collector plate 4B. The configuration of the current interruption means 44 is not limited to the above example as long as the electric current can be interrupted in case of an abnormality.

For the purpose of the electrical insulation of the positive electrode current collector plate 4A, the negative electrode current collector plate 4B, the positive external terminal 8A, and the positive external terminal 8B from the cover 6, the cover 6 is provided with gaskets 5, and insulating plates 7. An electrolyte is filled into the battery case 1 through an injection vent 9. Thereafter, a vent plug 11 is welded to the cover 6 by laser welding to seal up the injection vent 9, by which the prismatic secondary battery C1 is sealed hermetically.

Aluminum or aluminum alloy serving as metallic material is used for the material of the battery case 1 and the cover 6. Aluminum or aluminum alloy is used also as the material of the positive electrode current collector plate 4A and the positive external terminal 8A. Copper or copper alloy is used as the material of the negative electrode current collector plate 4B and the negative external terminal 8B.

Each of the positive external terminal 8A and the negative external terminal 8B has a welding joint part to be joined to a bus bar (not shown) or the like by means of welding. The welding joint part is in a rectangular prism shape protruding upward from the cover 6. The lower surface of the welding joint Part is opposed to the surface of the cover 6. The upper surface of the welding joint part extends in parallel with the cover 6 at a certain height position.

The lower surface of the welding joint part of the positive external terminal 8A is integrally provided with a positive electrode connection part 12A for connecting the positive external terminal 8A to the positive electrode current collector plate 4A. The lower surface of the welding joint part of the negative external terminal 8B is integrally provided with a negative electrode connection part 12B for connecting the negative external terminal 8B to the negative electrode current collector plate 4B.

The positive electrode connection part 12A is formed in a cylindrical shape protruding from the lower surface of the positive external terminal 8A so that its tip end can be inserted into a through hole 6A of the cover 6. The positive electrode connection part 12A protrudes through the cover 6 to reach the inside of the battery case 1 from a basal part 41A of the positive electrode current collector plate 4A. The tip end of the positive electrode connection part 12A is crimped, by which the positive external terminal 8A and the positive electrode current collector plate 4A are integrally fixed on the cover 6. The gasket 5 is arranged between the cover 6 and the positive external terminal 8A while the insulating plate 7 is disposed between the cover 6 and the positive electrode current collector plate 4A. Similarly, the negative electrode connection part 12B is formed in a cylindrical shape protruding from the lower surface of the negative external terminal 8B so that its tip end can be inserted into a through hole 6B of the cover 6. The negative electrode connection part 12B protrudes through the cover 6 to reach the inside of the battery case 1 from a basal part 41B of the negative electrode current collector plate 4B. The tip end of the negative electrode connection part 12B is crimped, by which the negative external terminal 8B and the negative electrode current collector plate 4B are integrally fixed on the cover 6. The gasket 5 is arranged between the cover 6 and the negative external terminal 8B while the insulating plate 7 is disposed between the cover 6 and the negative electrode current collector plate 4B.

The positive electrode current collector plate 4A has the basal part 41A in a rectangular plate-like shape which is arranged to face the lower surface of the cover 6 and a connection end part 42A which is bent at a lateral edge of the basal part 41A, extended toward the bottom of the battery case 1 along a wide surface of the battery case 1, overlaid on the positive electrode connection part 31d of the power generation element 3 to face the positive electrode connection part 31d, and connected to the positive electrode connection part 31d. The basal part 41A is formed to have an opening 43A into which the positive electrode connection part 12A is inserted. Similarly, the negative electrode current collector plate 4B has the basal part 41B in a rectangular plate-like shape which is arranged to face the lower surface of the cover 6 and a connection end part 42B which is bent at a lateral edge of the basal part 41B, extended toward the bottom of the battery case 1 along the wide surface of the battery case 1, overlaid on the negative electrode connection part 32d of the power generation element 3 to face the negative electrode connection part 32d, and connected to the negative electrode connection part 32d. The basal part 41B is formed to have an opening 43B into which the negative electrode connection part 12B is inserted.

Figure 3:
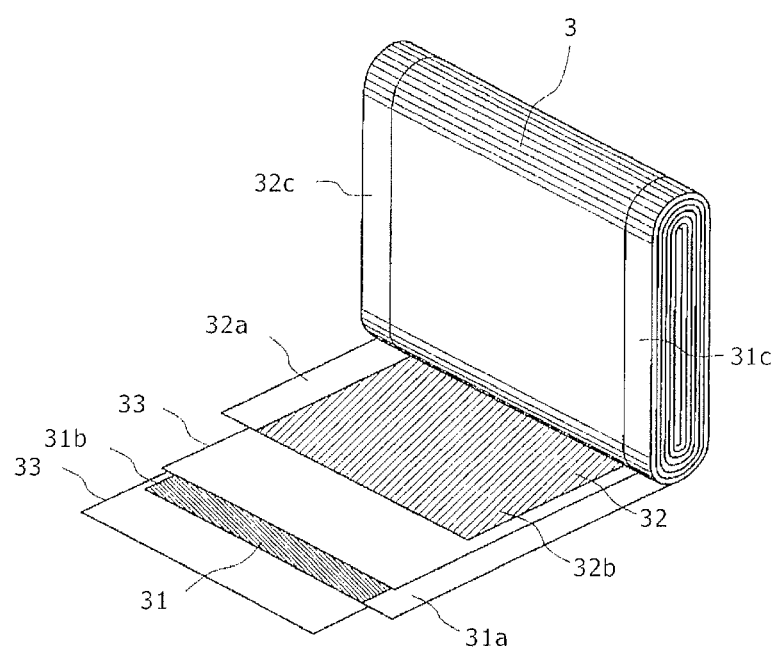
FIG. 3 is an exploded perspective view showing a power generation element of which a part is opened and extended.

FIG. 3 is an exploded perspective view showing the power generation element while opening and extending a part of the power generation element.

The power generation element 3 is an electrode assembly that is formed by a positive electrode body 31 and a negative electrode body 32 being flatly wound while a separator 33 is placed between the positive and negative electrode bodies 31 and 32 The positive electrode body 31 is formed by coating both sides of positive electrode foil 31a with a positive electrode compound 31b. The positive electrode body 31 has a positive electrode foil exposed part 31c (non-coated part) at one edge of the positive electrode foil 31a in regard to the width direction.

The negative electrode body 32 is formed by coating both sides of negative electrode foil 32a with a negative electrode compound 32b. The negative electrode body 32 has a negative electrode foil exposed part 32c (non-coated part) at one edge of the negative electrode foil 32a (opposite to the aforementioned edge of the positive electrode foil 31a) in regard to the width direction. The positive electrode body 31 and the negative electrode body 32 are wound together in a way that the positive electrode foil exposed part 31c and the negative electrode foil exposed part 32c are situated on opposite sides in the winding axis direction.

Figure 4:
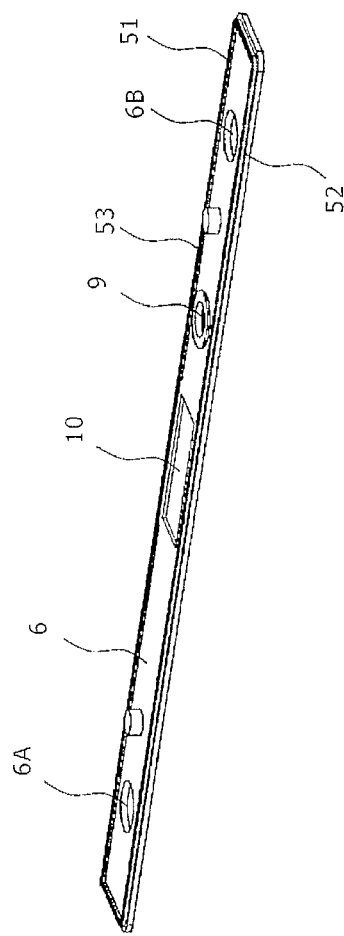
FIG. 4 is a perspective view showing a cover according to the first embodiment viewed from a lower surface's side.
Figure 5:
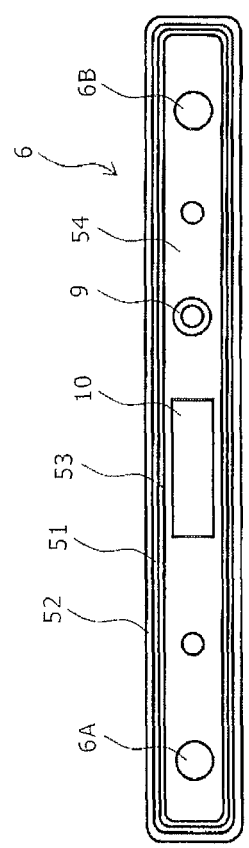
FIG. 5 is a plan view showing the lower surface of the cover according to the first embodiment.

FIG. 4 is a perspective view showing the cover viewed from the lower surface's side (i.e., viewed from the inside of the secondary battery). FIG. 5 a plan view showing the lower surface of the cover facing the inside of the secondary battery.

The cover 6 is in a shape like a flat plate in a size big enough to block the opening part 1a of the battery case 1. The cover 6 is provided with the through holes 6A and 6B, the injection vent 9 and the gas release vent 10. The cover 6 has a blockage part 54 and a contact part 52. The blockage part 54 extends at a substantially constant cover thickness to block the opening part 1a. The contact part 52, formed outside the blockage part 54 at a smaller cover thickness than the blockage part 54, extends along the entire outer peripheral edge of the cover 6 so as to contact the edge part (upper end) of the side wall part 21 of the battery case 1.

Inside the contact part 52, a convex part 51 is formed to project toward the inside of the battery case 1, face the inner surface of the side wall part 21 of the battery case 1, and extend continuously along the entire periphery of the side wall part 21. Further, a groove 53 is formed inside the convex part 51. The groove 53 is concavely formed in the blockage part 54.

Figure 6:
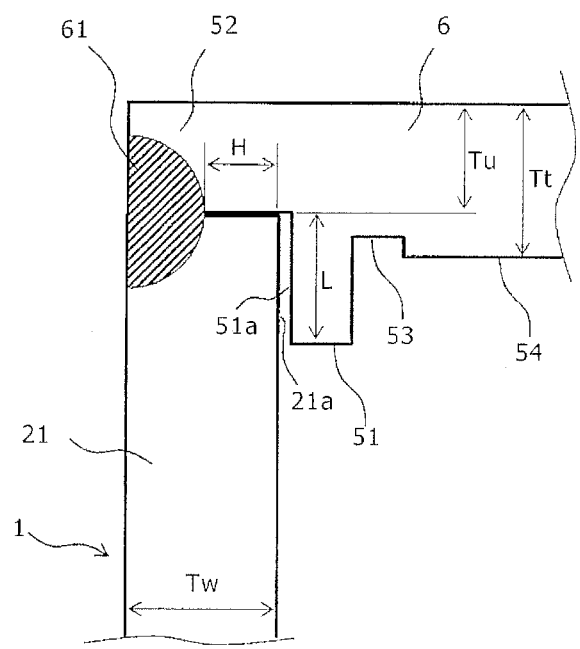
FIG. 6 is a cross-sectional view showing a joint part where a battery case and the cover are joined together.
Figure 7:
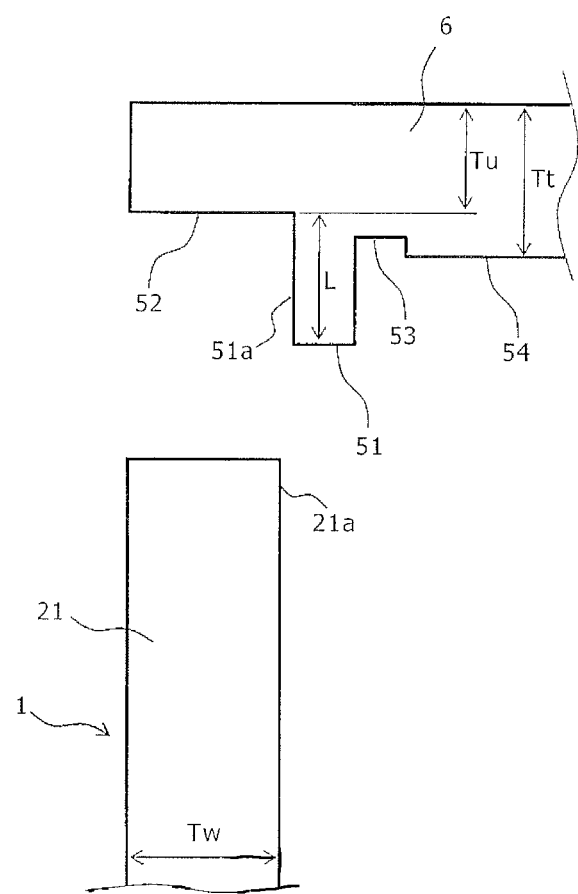
FIG. 7 is a cross-sectional view showing a state in which the battery case and the cover in FIG. 6 are separated from each other.

FIG. 6 is a cross-sectional view showing a joint part where the battery case and the cover are joined together. FIG. 7 is a cross-sectional view showing a state in which the battery case and the cover in FIG. 6 are separated from each other.

The contact part 52 of the cover 6, while being placed in contact with the edge part of the side wall part 21 of the battery case 1, is subject to laser welding from the outside of the battery case 1, that is, from the side surface (left side in FIG. 6). A weld part 61 is then formed between the contact part 52 of the cover 6 and the edge part of the side wall part 21 of the battery case 1, by which the cover 6 and the battery case 1 are joined together. The weld part 61 is formed continuously along the entire outer peripheral edge of the cover 6 to seal up the opening part of the battery case 1.

The convex part 51 faces the inner surface of the side wall part 21 of the battery case 1. In this state, a gap can occur between the convex part 51 and the side wall part 21 of the battery case 1 since the dimension of the convex part 51, in consideration of the dimensional tolerance, has been set to be smaller than the internal dimension of the side wall part 21 of the battery case 1 so that the convex part 51 can be fit in the side wall part 21 without much difficulty.

The contact part 52, the convex part 51 and the groove 53 along the entire periphery of the cover 6 can be formed with ease by means of press work. The convex part 51 can be formed by use of excess volume caused in the formation of the contact part 52 and the groove 53 both having smaller cover thicknesses than the blockage part 54. The convex part 51 is formed so that its projection height from the contact part 52 toward the inside of the battery case 1 equals a prescribed height L. With this configuration, the length or distance for which the cover 6 and the edge part of the side wall part 21 of the battery case 1 face each other can be increased by the height L.

Figure 10:
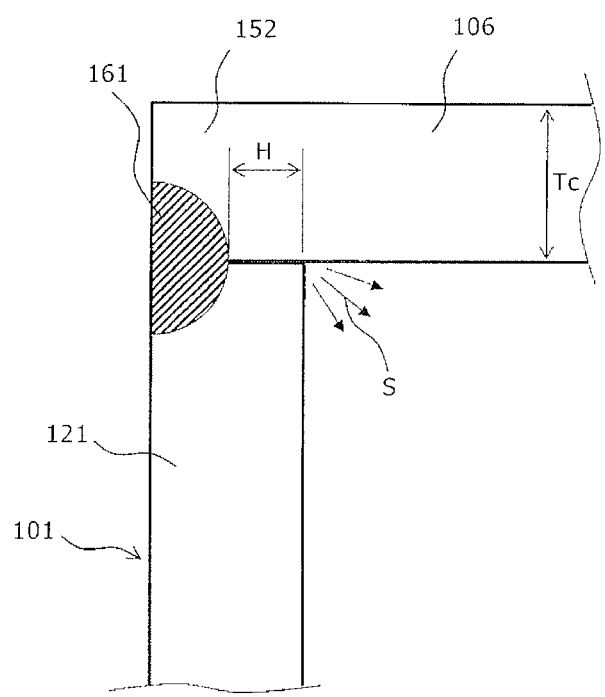
FIG. 10 is a cross-sectional view for explaining a conventional example.

FIG. 10 is a cross-sectional view corresponding to FIG. 6, showing a comparative example for explaining the operational advantages of the present embodiment.

In the prismatic secondary battery shown in FIG. 10 as a comparative example, a cover 106 is formed in a shape like a flat plate having a constant thickness Tc. A contact part 152 of the cover 106 is set on an edge part of a side wall part 121 of a battery case 101 before laser welding is performed between the side wall part 121 and the contact part 152 from the side. In this case, the spatter S caused by the laser welding can pass through a gap between the edge part of the side wall part 121 and the contact part 152 of the cover 106 and then drop to the inside of the battery case 101.

In particular, in a case where the end depth of a weld part 161 is increased in order to securely seal up the secondary battery, the length H of the gap between the edge part of the side wall part 121 and the contact part 152 of the cover 106 would decrease along with the increase in the end depth of the weld part 161. The spatter S would easily enter the battery case 101 as a result.

In contrast, in the present embodiment (see FIG. 6), the cover 6 is provided with the convex part 51. Consequently, the length of the gap formed between the cover 6 and the edge part of the side wall part 21 of the battery case 1 is secured by the length of the convex part 51. Therefore, if the edge part of the side wall part 21 and the contact part 52 of the cover 6 are joined together by laser welding from the outside of the battery case 1, it will be possible to have the spatter actively adhere to an inner wall surface 21a of the side wall part 21 or an opposing surface 51a of the convex part 51 and remain in the gap between the side wall part 21 and the convex part 51. As a result, the spatter can be effectively prevented from passing through the gap between the edge part of the side wall part 21 and the contact part 52 of the cover 6 and dropping to the inside of the battery case 1.

In the case of laser welding, increasing the end depth of the weld part 61 would lead to a corresponding rise in the welding width at the proximal end. Thus, in order to carry out the welding deeper and seal up the secondary battery more securely, the contact part 52 is required to have a certain cover thickness. In the present embodiment, the cover thickness Tu of the contact part 52 is set greater than ½ of the cover thickness Tt of the blockage part 54 and is less than the cover thickness Tt of the blockage part 54 (Tt/2<Tu<Tt), allowing it to secure the welding area of the weld part 61 as wide as possible and to increase the depth of the weld part 61.

Increasing the depth of the weld part 61 adversely would lead to a decrease in the length H of the gap between the edge part of the side wall part 21 and the contact part 52 of the cover 6. In the present embodiment however, the cover 6 is provided with the convex part 51. The length of the gap formed between the cover 6 and the edge part of the side wall part 21 of the battery case 1 is secured by the height L of the convex part 51. Therefore, the spatter caused by the laser welding can be effectively prevented from passing through the gap between the edge part of the side wall part 21 and the contact part 52 of the cover 6 and dropping to the inside of the battery case 1. As described above, the mixing of metallic foreign matters into the battery case 1 due to the spatter can be prevented at the time of the laser welding of the cover 6 to the battery case 1 performed from the outside of the battery case 1. Accordingly, a prismatic secondary battery C1 with high reliability can be provided.

It should be noted that while an example in which the groove 53 is formed inside the convex part 51 has been described in the above embodiment, the configuration of the cover 6 is not limited to this example as long as the convex part 51 can be formed to have a prescribed height. That is, the groove 53 is not a requisite.

Second Embodiment

Next, a second embodiment will be described below with reference to FIGS. 8, 9 and 11.

Figure 8:
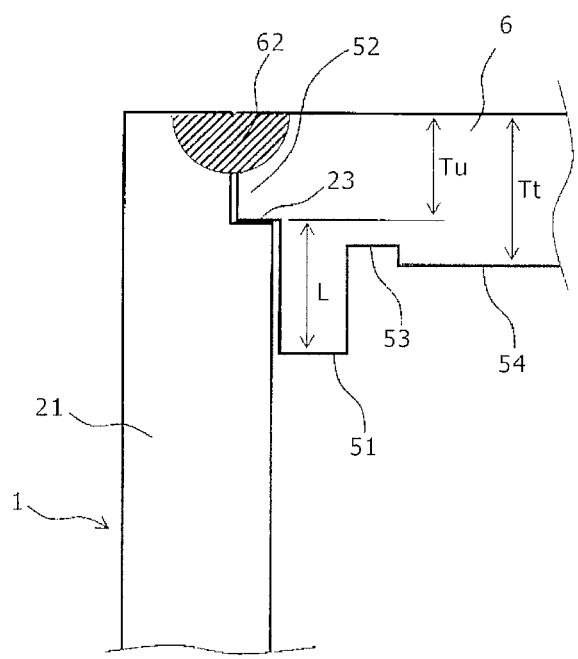
FIG. 8 is a cross-sectional view showing a joint part where a battery case and a cover of a prismatic secondary battery in accordance with a second embodiment of the present invention are joined together.
Figure 9:
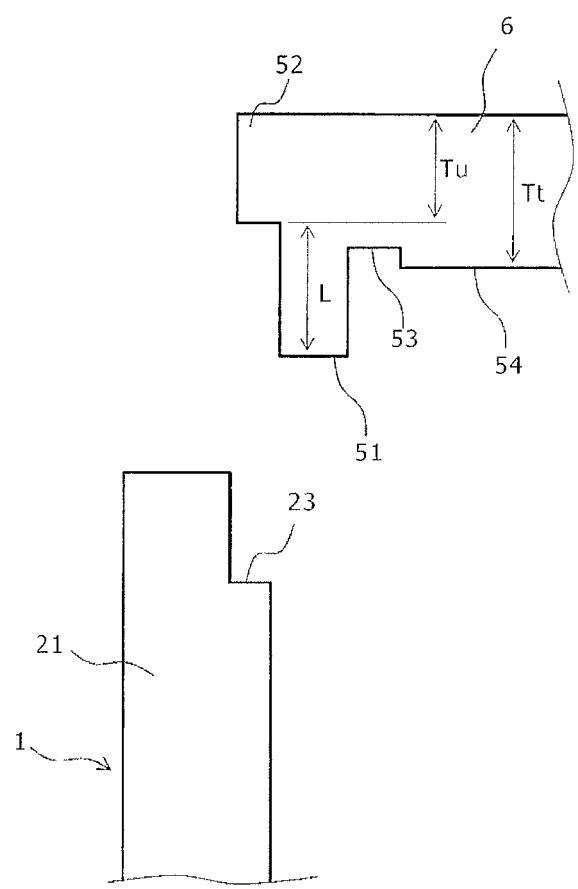
FIG. 9 is a cross-sectional view showing a state in which the battery case and the cover in FIG. 8 are separated from each other.

FIG. 8 is a cross-sectional view showing a joint part where a battery case and a cover of a prismatic secondary battery according to a second embodiment of the present invention are joined together. FIG. 9 is a cross-sectional view showing a state in which the battery case and the cover in FIG. 8 are separated from each other. Elements in FIGS. 8 and 9 equivalent to those in the first embodiment are assigned the same reference characters as in the first embodiment and detailed explanation thereof is omitted for brevity.

Characteristic features of the present embodiment are as follows: A step 23 is formed in the edge part of the side wall part 21 of the battery case 1. The battery case 1 is sealed up by fitting the battery cover 6 in the side wall part 21 of the battery case 1 and performing laser welding between the battery cover 6 and the side wall part 21 from above the battery case 1.

The edge part of the side wall part 21 of the battery case 1 is formed to have the step 23. The step 23 is continuously formed peripherally on the inner side of the edge part of the side wall part 21. The contact part 52 of the cover 6 is placed in contact with the step 23. The laser welding is performed between the edge part of the side wall part 21 and the contact part 52 of the cover from above (from the outside of the battery case 1). By the laser welding, a weld part 62 is formed between the contact part 52 of the cover 6 and the edge part of the side wall part 21 of the battery case 1. The weld part 62 is formed continuously along the entire outer periphery of the cover 6 to seal up the opening part of the battery case The convex part 51 faces the inner side of the side wall part 21 of the battery case 1 along the entire periphery. In this state, a gap can occur between the convex part 51 and the side wall part 21 of the battery case 1 since the dimension of the convex part 51, in consideration of the dimensional tolerance, has been set to be smaller than the internal dimension of the side wall part 21 of the battery case 1 so that the convex part 51 can be fit in the side wall part 21 without much difficulty.

Figure 11:
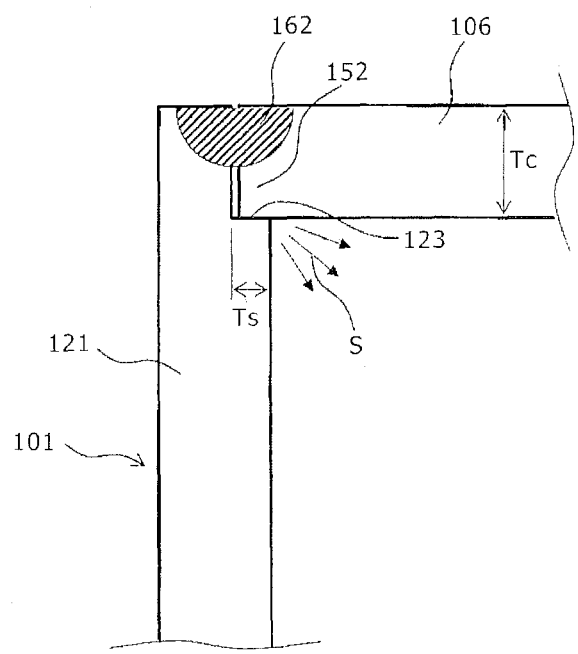
FIG. 11 is a cross-sectional view for explaining another conventional example.

FIG. 11 is a cross-sectional view corresponding to FIG. 8, showing a comparative example for explaining the advantages of the present embodiment.

In the prismatic secondary battery shown in FIG. 11 as a comparative example, a cover 106 is formed in a shape like a flat plate having a constant thickness Tc. A contact part 152 of the cover 106 is set on a step 123 in an edge part of a side wall part 121 and laser welding is performed between the side wall part 121 and the contact part 152 from above the cover 106. As a result, the length for which the side wall part 121 and the contact part 152 face each other may not be long enough. And hence, the spatter S caused by the laser welding can pass through a gap between the step 123 of the side wall part 121 and the contact part 152 of the cover 106 and then drop to the inside of the battery case 101.

In the laser welding, increasing the end depth of the weld part 162 leads to a corresponding rise in the welding width at the proximal end. Thus, the weld part 162 should be preferably situated inward of the battery case 1 (right side in FIG. 11) in an allowable range. This requires it to reduce the indent Ts of the step 123 from the inner surface of the side wall part 121. Consequently, the length of the gap between the edge part of the side wall part 121 and the contact part 152 of the cover 6 decreases and the spatter S tends to enter the battery case 1.

In contrast, in the present embodiment, the cover 6 is provided with the convex part 51 and because of it, the length of the gap formed between the cover 6 and the edge part of the side wall part 21 of the battery case 1 is ensured to be at least as great as the length of the convex part 51 as shown in FIG. 8. Therefore, when laser welding is performed between the edge part of the side wall part 21 and the contact part 52 of the cover 6 from the outside of the battery case 1, it will be possible to have the spatter actively adhere to the side wall part 21 or the convex part 51 and remain in the gap between the side wall part 21 and the convex part 51. Accordingly, the spatter caused by the laser welding can be effectively prevented from passing through the gap between the edge part of the side wall part 21 and the contact part 52 of the cover 6 and dropping to the inside of the battery case 1.

As described above, the mixing of metallic foreign matters into the battery due to the spatter can be prevented at the time of the laser welding of the cover 6 to the battery case 1 performed from the outside of the battery case 1 and a prismatic secondary battery C1 with high reliability can be provided.

The present invention is not limited to the above embodiments and may embrace varieties of modifications without departing from the spirit of the invention. The embodiments, for example, have only been described in detail for a better understanding of the invention and are therefore not necessarily limited to the configurations containing all described constituent elements. In addition, part of the configuration of a certain embodiment may be replaced by the configuration of another embodiment and the configuration of a certain embodiment may be added to the configuration of another embodiment. Furthermore, part of the configuration of one of the embodiments may be added to, deleted from, and/or replaced by the other embodiments.

REFERENCE NUMERALS 1 battery case
1a opening part
3 power generation element (electrode assembly)
4A positive electrode current collector plate (current collector terminal)
4B negative electrode current collector plate
6 cover (battery cover)
8A positive external terminal (external terminal)
8B negative external terminal
12A positive electrode connection part
12B negative electrode connection part
21 side wall part
22 bottom wall part
51 convex part
52 contact part
53 groove
54 blockage part
61, 62 weld part
C1 prismatic secondary battery

The invention claimed is:

1. A prismatic secondary battery comprising:
  a battery case in a prismatic shape which includes a bottom wall part in a rectangular shape forming a bottom, a side wall part in a prismatic tubular shape forming a side wall, and an opening part being open upward at an upper end of the side wall part; and
  a battery cover which is welded to the upper end of the side wall part of the battery case and seals up the opening part, wherein:
  the battery cover has a blockage part which blocks up the opening part, a contact part which is in contact with the upper end of the side wall part continuously along an entire periphery at a position outside the blockage part, and a convex part which projects from the blockage part toward the bottom wall part;
  cover thickness at the contact part is less than cover thickness at the blockage part, wherein the battery cover has a groove part along an inner periphery of the convex part, the groove being formed on an inner surface of the battery cover; and
  the convex part is formed by use of excess volume caused at a time of formation of the contact part and the groove part and extends continuously around an entire periphery of the battery cover adjacent to an inner surface of the side wall part.

2. The prismatic secondary battery according to claim 1, wherein the contact part and the side wall part are joined together by laser welding from a side of the battery case.

3. The prismatic secondary battery according to claim 1, wherein:
  the upper end of the side wall part is formed of a first surface and a second surface provided at a position lower than the first surface;
  the second surface is continuously formed peripherally more internally of the battery case than the first surface;
  the contact part is in contact with the second surface; and
  the battery cover is fitted in the side wall part.

4. The prismatic secondary battery according to claim 3, wherein laser welding is performed between the first surface and the contact part from above the battery case.

5. The prismatic secondary battery according to claim 1, wherein the convex part is spaced from the inner surface of the side wall part such that a gap is formed therebetween.

6. The prismatic secondary battery according to claim 5, wherein the gap extends continuously around the entire periphery of the battery cover.

7. The prismatic secondary battery according to claim 1, wherein the convex part forms a continuous wall having a shape which matches a shape of the battery cover and a shape of the upper end of the side wall part.

8. The prismatic secondary battery according to claim 7, wherein a dimension of the continuous wall is smaller than a corresponding dimension of the upper end of the side wall part such that a gap is formed between the continuous wall and the side wall part.

* * * * *